May 26, 1959          T. G. HARE          2,888,235

VALVE WITH BALL BEARING MOUNTED SEALING MEMBER

Filed June 29, 1956

INVENTOR.
TERENCE G. HARE
BY
Barnes Kisselle Laughlin & Raisch

ATTORNEYS.

United States Patent Office 2,888,235
Patented May 26, 1959

2,888,235
VALVE WITH BALL BEARING MOUNTED SEALING MEMBER

Terence G. Hare, Detroit, Mich.

Application June 29, 1956, Serial No. 594,798

5 Claims. (Cl. 251—88)

This invention relates to a faucet or valve having a rotary control member with a seal member mounted on an anti-friction bearing so that when the seal member is engaged and released from its seat, there is no relative rotary movement between the seal member and its seat.

One object of the invention is to provide an improved construction capable of manufacture economically and with facility and which embodies a structure constructed with a minimum number of parts. To this end, only two major elements are embodied in the structure other than the ball bearing elements, and these two elements are permanently and rotatably united by shaping metal parts of one into engaging relation with parts of the other. Another object is to provide an interconnection between a rotary valve control member and the holder for a seal member, so arranged and constructed that very close tolerances can be held, to the end that, on the one hand, adequate running and operating clearance is provided for ball bearings interposed between the control member and the holder and, on the other hand, the control member and holder are rotatably united so that there is a minimum of relative axial movement therebetween.

Another object of the invention is to provide an improved means and operation for assembling and holding the parts together where portions of one part are permanently fashioned into engagement with cooperating structure. To this end, an additional element is applied which causes the fashioning or distortion of some of the parts and this element remains in the finished assembly to thus strongly hold the fashioned parts in their cooperating relationship with other structure.

The invention is disclosed in the accompanying drawings.

Figure 1:
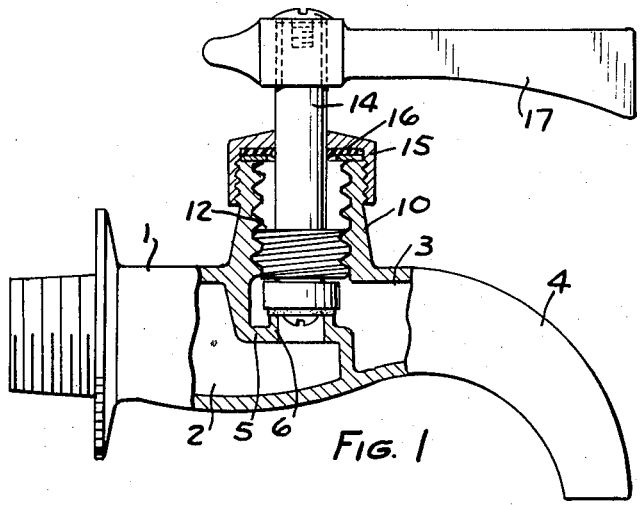
Fig. 1 is a general view of a faucet constructed in accordance with the invention with some of the parts shown in section.

A valve is shown in Fig. 1 of the type normally termed a faucet, and, of course, the invention is applicable to any valve although it may be particularly useful in faucets used in plumbing. The faucet has a body 1 with an inlet chamber 2, an outlet chamber 3 which leads to a spigot 4. A partition 5 separates the chambers and the partition has a port therein defined by a valve seat 6. The body has an internally threaded extension 10 and a valve member 12 has a threaded body engaged with the internal threads. An operating stem 14 projects through a cap 15 which is threaded to the body of the faucet. A sealing washer of rubber or the like, as shown at 16, engages the stem to prevent leaks and the stem has an operating handle 17.

Figure 2:
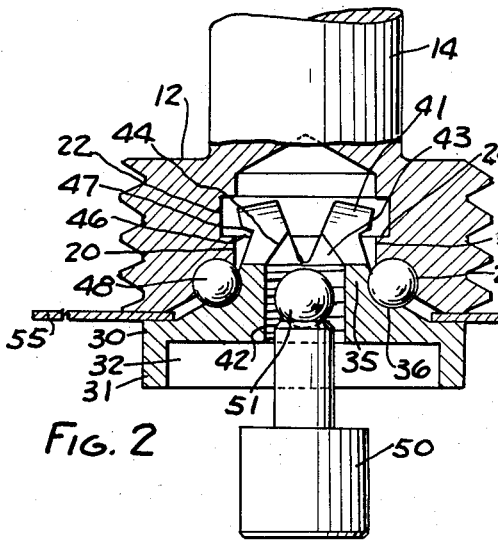
Fig. 2 is an enlarged cross sectional view showing the parts about to be assembled.

The body 12 is formed, as shown in Fig. 2, with a reentrant recess. The recess has a cylindrical portion 20 and an enlarged or reentrant inner portion 22. The reentrant portion 22 is defined in part by an internal annular shoulder 23 with a surface 24. This shoulder is a square shoulder or substantially square. By this is meant that the inner surface of the shoulder 24 is substantially at right angles to the axis. The end of the body adjacent the outer end of the portion 20 of the recess is formed with a circumferential raceway 25.

Figure 4:
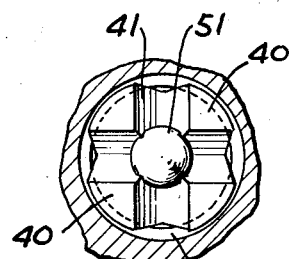
Fig. 4 is a sectional view taken substantially on line 4—4 of Fig. 3.

There is a holder for the sealing washer illustrated at 30. It may have a circumferential flange 31 defining a recess 32 for receiving sealing washer 34. This holder has an extension 35, and at the juncture of the extension 35 and the body of the holder is a raceway 36. The end of the extension 35 is segmented as shown in Fig. 4. This is accomplished by slots or kerfs 40. Preferably, there are two kerfs formed at right angles to each other and thus intersecting. This provides four segments 41.

The holder is provided with an axial internally threaded aperture 42. Extending from the aperture 42 and concentric therewith is a recess 43 which terminates at its upper end, using the term "upper" relatively, and in connection with Fig. 2, in an inclined manner so that each segment 41 has an internal inclined face 44. The recess 43 and the inclined faces 44 may be formed by a boring tool provided with a properly shaped end for boring out the metal to provide the cavity 43 and the inclined faces 44. The exterior surfaces of the segments are each formed with an external recess 46. The several recesses combine to form a circumferential recess and the surface defining the upper wall of the recess 46 is angularly disposed as shown at 47. The extension 35 passes freely into the portion 20 of the recess in the body 12 as shown in Fig. 2 and an annulus of ball bearings 48 is disposed in the matching raceways 25 and 36.

Figure 3:
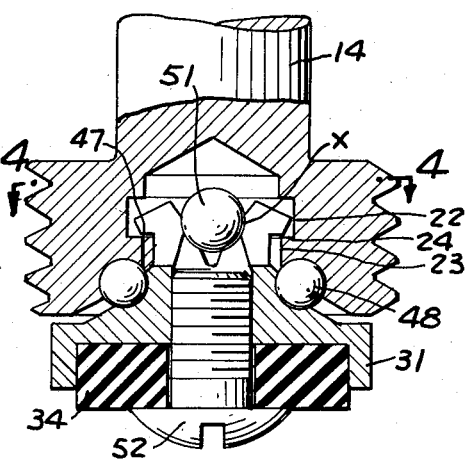
Fig. 3 is a view illustrating the finished assembly.
Figure 5:
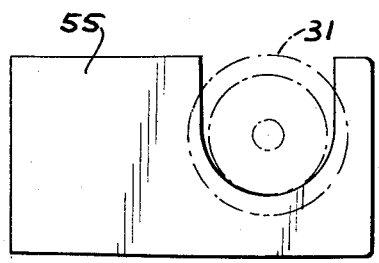
Fig. 5 is a view illustrating a tool used in making the assembly.

With the parts assembled in a manner shown in Fig. 2 the segments are fashioned outwardly so that the surfaces 47 come into overlapping relationship with the surface 24 of the shoulder 23. This is preferably done by employing an additional insert member. A suitable tool 50 is constructed to receive and hold a ball 51. With the tool and ball positioned, as shown in Fig. 2, the tool is advanced and the ball 51 engages the inclined surfaces 44 of the segments and spreads the segments outwardly to a position as shown in Fig. 3. Preferably the material of the holder 30 is of brass and thus relatively soft while the ball 51 is preferably of stainless steel and thus relatively hard. As the tool pushes the ball into position the body 12 and the holder 30 are held accurately spaced from each other by a suitable tool 55 (Fig. 5) disposed between the two as shown in Fig. 2. The ball is of such a size as to forcibly bend the metal of the segments and forcibly bring the shoulders 47 against the shoulder 24. Thus the body 12 of the valve member and the holder 30 are brought into snug engagement with each other with the interposed tool 55. At the same time the force causes the surfaces of the relatively hard ball to become indented into the metal of the segments. This is done by the flowing of or the displacing the metal of the segments so that the ball becomes seated between the segments lying in recesses $x$ therein which recesses are caused by the compressive forces. The tool 50 is at no time in frictional engagement with the holder 30 or its segments and after the ball is thus located the tool is easily removed and exerts no friction upon any of the valve parts which might otherwise tend to distort them. Then the tool 55 is removed a desired spacing between the valve member 12 and the holder 30 is provided. Furthermore, upon removal of the tool 55 an adequate running freedom or clearance is afforded for the ball bearings.

To further explain the structure and its operation, and to set forth how the balls are not subjected to a binding action, the following example may be given: The angle of the surfaces 47 are advantageously about 25° from the horizontal, that is, about 65° from the axis. The included angle between opposite inclined surfaces 44 is about 60°; in other words, each surface 44 is about 30° from the axis. When the ball is passed in between the segments the segments will bend outwardly and the surfaces 47 are pushed against the annular surface 24. This is because the ball is working against the surfaces 44 which are about 30° from the axis while the surfaces 47 are only about 25° from the horizontal surface 24. After the holder has been thus secured to the valve member the sealing washer 34 may be located and may be held in position by a screw 52 threaded into the recess 42.

Thus the structure embodies two principal portions, namely, the valve member and the holder permanently and rotatably united with the annulus of balls therebetween. In this analysis the washer 34 and its holding screw 52 are not included as these are standard parts in any faucet of this type.

By the use of the added insert member in the form of the ball 51, which member remains in situ, the segments are expanded with facility. No expanding tool need be forcibly removed which might otherwise disturb the setting of the segments. The ball is a low cost item and because it is a ball it does not need to be positioned, guided or held in any particular manner because of its perfect symmetry. The fact that the internal shoulder 24 is perpendicular to the axis or, in other words, that it is a square shoulder provides for attaining and maintaining a close operating clearance for the ball bearings. This clearance is determined by the thickness of the tool 55 which is of such thickness that when the shoulders 47 of the segments are forcibly applied to the annular shoulder 24 and the holder 30 drawn upwardly as Figs. 2 and 3 are viewed there is at this time a proper running clearance for the ball bearings.

I claim:

1. A valve structure comprising a valve member adapted to be moved toward and away from a seal in a valve body, a washer holder of readily permanently deformable material, said valve member having a circular reentrant recess adjacent the lower end thereof and an opening providing comunication between said recess and the lower end of said valve member, the diameter of said opening being less than the largest diameter of said reentrant recess, an annular raceway on said valve member extending around the lower end thereof, a complementary annular raceway on the holder, an annulus of balls between the raceways, said holder having an axial extension projecting upwardly through said opening into said recess of the valve member, said holder having an axial bore therethrough, and means for permanently and rotatably securing the holder with the valve member comprising a plurality of integral segments on the upper end of said axial extension, each said segment having an upper end portion of radially enlarged cross section connected with the holder by a lower end portion of reduced radial cross section, said upper end portion of each said segment having a curved outer surface, said recess in said valve member having an annular seating surface extending radially outwardly from the upper end of the opening at an angle with the axis of said opening and forming a shoulder, each said segment being permanently deformed beyond its elastic limit at said radially reduced portion in a radially outward direction to a position wherein said curved outer surface is closely adjacent said shoulder so as to permanently secure together the holder and the valve member and permit free rotation of said holder relative to said valve member, each said segment having its upper end portion extending radially inwardly of said bore prior to its being deformed outwardly, the radially innermost portions of the upper end portions of said segments defining a circle concentric with the axis of the bore, said bore extending to said segments, and a ball driven upwardly through the bore past said shoulder and forceably disposed between the upper end portions of said segments to permanently deform and hold said segments radially outwardly into closely adjacent relationship to said shoulder, a washer, means for removably securing said washer on the lower end of said holder, the position of said segments being unaffected by operation of said latter means to effect removal of said washer.

2. The combination set forth in claim 1 wherein the lower end of said axial bore is threaded, said means for removably securing said washer on the lower end of said holder comprising a headed screw in threaded engagement with the threaded portion of the bore.

3. The combination set forth in claim 2 wherein the upper end of said screw terminates below the radially innermost portions of the segments.

4. The combination set forth in claim 1 wherein said annular seating surface in said valve member is substantially at a right angle to the axis of the member.

5. A valve structure comprising a valve member adapted to be moved toward and away from a seal in a valve body, a washer holder of readily permanently deformable material, said valve member having a circular reentrant recess adjacent the lower end thereof and an opening providing communication between said recess and the lower end of said valve member, the diameter of said opening being less than the largest diameter of said reentrant recess, an annular raceway on said valve member extending around the lower end thereof, a complementary annular raceway on the holder, an annulus of balls between the raceways, said holder having an axial extension projecting upwardly through said opening into said recess of the valve member, said holder having an axial bore therethrough, and means for permanently and rotatably securing the holder with the valve member comprising a plurality of integral segments defined by longitudinally extending slots in the upper end of said axial extension, each said segment having an upper end portion of radially enlarged cross section connected with the holder by a lower end portion of reduced radial cross section, said upper end portion of said segment having a curved outer surface having a radius of curvature less than the radius of curvature of said annular seating surface, said recess in said valve member having an annular seating surface extending radially outwardly from the upper end of the opening at an angle with the axis of said opening and forming a shoulder, each said segment being permanently deformed beyond its elastic limit at said radially reduced portion in a radially outwardly direction to a position wherein said curved outer surface is closely adjacent said shoulder so as to permanently secure together the holder and the valve member and permit free rotation of said holder and at the same time to permit said segments to engage said shoulder in radial line contact, each said segment having its upper end portion extending radially inwardly of said bore prior to its being deformed outwardly, the radially innermost portions of the upper end portions of said segments defining a circle concentric with the axis of the bore, said bore extending to said segments, and a ball driven upwardly through the bore past said shoulder and forceably disposed between the upper end portions of said segments to permanently deform and hold said segments radially outwardly into closely adjacent relationship to said shoulder, a washer, means for removably securing said washer on the lower end of said holder, the position of said segments being unaffected by operation of said latter means to effect removal of said washer.

(References on following page)

References Cited in the file of this patent

UNITED STATES PATENTS

| | | |
|---|---|---|
| 1,186,829 | Pohlman | June 13, 1916 |
| 2,216,459 | Siclari | Oct. 1, 1940 |
| 2,302,590 | Waite | Nov. 17, 1942 |
| 2,566,502 | Smith | Sept. 4, 1951 |
| 2,616,328 | Kingsmore | Nov. 4, 1952 |

FOREIGN PATENTS

| | | |
|---|---|---|
| 23,006 | France | Apr. 8, 1859 |
| 3,866 | Great Britain | of 1879 |
| 25,749 | Great Britain | Nov. 28, 1909 |
| 30,022 | Great Britain | Dec. 24, 1910 |